United States Patent
Lee et al.

(10) Patent No.: US 10,096,091 B2
(45) Date of Patent: Oct. 9, 2018

(54) IMAGE GENERATING METHOD AND APPARATUS

(71) Applicant: SAMSUNG ELECTRONICS CO., LTD., Suwon-si (KR)

(72) Inventors: Kyoobin Lee, Seoul (KR); Eric Hyunsurk Ryu, Hwaseong-si (KR); Keun Joo Park, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 125 days.

(21) Appl. No.: 15/210,243

(22) Filed: Jul. 14, 2016

(65) Prior Publication Data
US 2017/0140509 A1    May 18, 2017

(30) Foreign Application Priority Data
Nov. 16, 2015    (KR) .................. 10-2015-0160206

(51) Int. Cl.
| | |
|---|---|
| G06T 3/00 | (2006.01) |
| G06T 5/00 | (2006.01) |
| H04N 5/232 | (2006.01) |
| G06T 5/50 | (2006.01) |

(52) U.S. Cl.
CPC .............. *G06T 5/003* (2013.01); *G06T 5/50* (2013.01); *H04N 5/23248* (2013.01); *H04N 5/23264* (2013.01); *G06T 2207/10004* (2013.01); *G06T 2207/20201* (2013.01); *G06T 2207/20212* (2013.01)

(58) Field of Classification Search
CPC .... G06T 7/30–7/38; G06K 9/20–9/348; G06F 1/32–1/3296
See application file for complete search history.

(56) References Cited

U.S. PATENT DOCUMENTS

| | | | |
|---|---|---|---|
| 7,916,177 B2 | 3/2011 | Motomura et al. | |
| 9,008,366 B1 * | 4/2015 | Kim ..................... | G06K 9/6202 |
| | | | 382/103 |

(Continued)

FOREIGN PATENT DOCUMENTS

| | | |
|---|---|---|
| CN | 101848369 A | 9/2010 |
| CN | 104284158 A | 1/2015 |

(Continued)

OTHER PUBLICATIONS

Manuele Rusci et al., "An Event-Driven Ultra-Low-Power Smart Visual Sensor", IEEE Sensors Journal, vol. 16, No. 13, Jul. 1, 2016, pp. 5344-5353.*

(Continued)

*Primary Examiner* — Brian P Werner
(74) *Attorney, Agent, or Firm* — Sughrue Mion, PLLC

(57) ABSTRACT

An image generating method and an image generating apparatus are provided. The image generating method includes generating a first image based on first event signals that are output from an event-based vision sensor during a first time period and stored in a buffer, generating a second image based on second event signals that are output from the event-based vision sensor during a second time period and stored in the buffer, and aligning the first image and the second image to generate a third image having a quality that is higher than qualities of the first image and the second image.

29 Claims, 15 Drawing Sheets

(56) References Cited

U.S. PATENT DOCUMENTS

2013/0182119 A1* 7/2013 Eledath ............ G06K 9/209
   348/159
2015/0062351 A1 3/2015 Heinzle et al.

FOREIGN PATENT DOCUMENTS

| JP | 05-167975 A | 7/1993 |
|---|---|---|
| JP | 06-350972 A | 12/1994 |
| JP | 09-261526 A | 10/1997 |
| JP | 2011-199786 A | 10/2011 |
| KR | 10-2013-0040517 A | 4/2013 |

OTHER PUBLICATIONS

Hanme Kim, et al., "Simultaneous Mosaicing and Tracking with an Event Camera", Proceedings of the British Machine Vision Conference 2014, Jan. 1, 2014, XP055355156, total 1 page.

Varad Gunjal, "Development of Feature Descriptors for Event-Based Vision Sensors", Thesis, Birla Institute of Technology and Science, Dec. 18, 2012, XP055195885, total 79 pages.

Basil Huber, "High-Speed Pose Estimation using a Dynamic Vision Sensor", Master Thesis, Robotics and Perception Group, University of Zurich, Mar. 1, 2014, XP055162714, total 57 pages.

Rohan Ghosh, et al., "Real-Time Object Recognition and Orientation Estimation Using an Event-Based Camera and CNN", 2014 IEEE Biomedical Circuits and Systems Conference (BIOCAS) Proceedings, Oct. 22, 2014, XP032701779, total 4 pages.

Communication dated Mar. 31, 2017, issued by the European Patent Office in counterpart European Application No. 16182062.6.

Minjae Kim, et al., "A Novel Framework for Extremely Low-light Video Enhancement", 2014 IEEE International Conference on Consumer Electronics (ICCE), pp. 91-92.

Ziyang Ma, et al., "Handling Motion Blur in Multi-Frame Super-Resolution", Computer Vision Foundation, 2015, pp. 5224-5232.

* cited by examiner

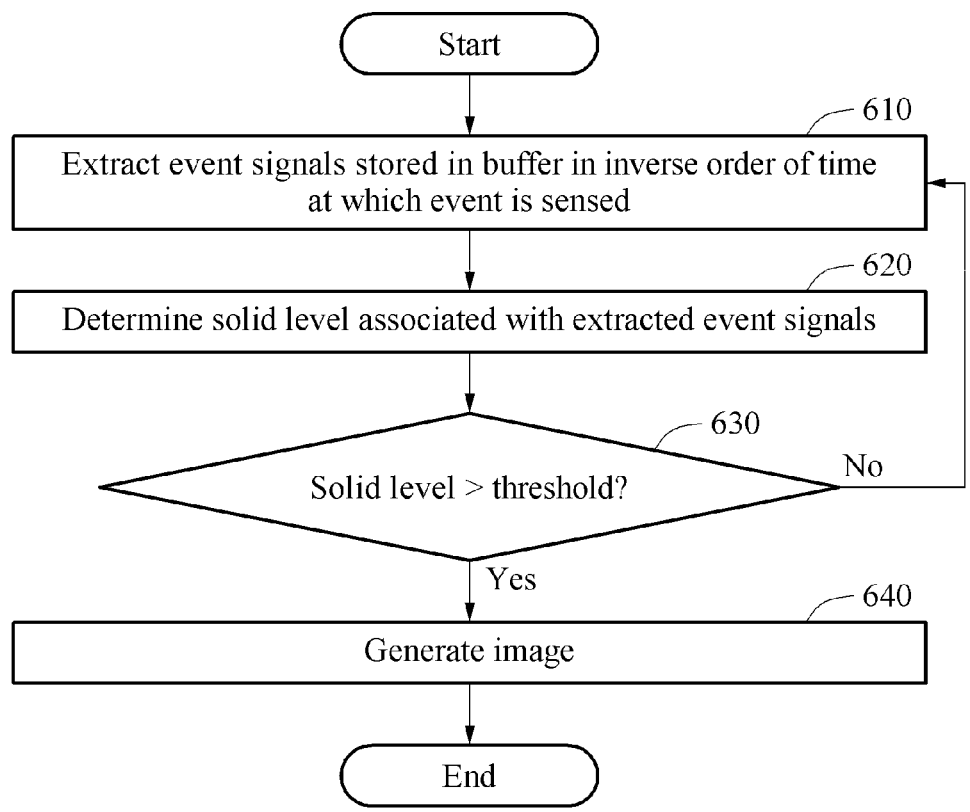

IMAGE GENERATING METHOD AND APPARATUS

CROSS-REFERENCE TO RELATED APPLICATION

This application claims priority from Korean Patent Application No. 10-2015-0160206, filed on Nov. 16, 2015, in the Korean Intellectual Property Office, the disclosure of which is incorporated herein by reference in its entirety.

BACKGROUND

1. Field

Methods and apparatuses consistent with exemplary embodiments relate to an image generating method and an image generating apparatus.

2. Description of the Related Art

To improve a quality of an image acquired by a frame-based vision sensor, technology that removes blur caused by hand shake and technology that sharpens a blurry image at a low illumination, may be used. Unlike the frame-based vision sensor, an event-based vision sensor responds to a change in light, and thus detects only a contour of a moving object. An image acquired by the event-based vision sensor includes only a contour of an object, and thus high-speed processing may be performed due to its relatively small data amount and privacy may be protected. However, in a case of generating a single image by collecting events output from the event-based vision sensor, the quality of a generated image may be lower than the quality of an image acquired by the frame-based vision sensor.

SUMMARY

Exemplary embodiments may address at least the above problems and/or disadvantages and other disadvantages not described above. Also, the exemplary embodiments are not required to overcome the disadvantages described above, and an exemplary embodiment may not overcome any of the problems described above.

According to an aspect of an exemplary embodiment, there is provided an image generating method including generating a first image based on first event signals that are output from an event-based vision sensor during a first time period and stored in a buffer, generating a second image based on second event signals that are output from the event-based vision sensor during a second time period and stored in the buffer, and aligning the first image and the second image to generate a third image of a quality higher than qualities of the first image and the second image.

Each of the first event signals and the second event signals may include identification information indicating a pixel sensing an event, among pixels included in the event-based vision sensor, and time information indicating a time at which the event is sensed.

A number of the first event signals may be greater than a number of the second event signals.

The generating the first image may include extracting the stored first event signals from the buffer in an inverse order of time at which an event is sensed, determining a threshold for the first image based on dispersion of the extracted first event signals, determining whether a number of the extracted first event signals is greater than the threshold, and extracting, from the buffer, one or more additional event signals that are stored in the buffer in an inverse order of time at which an event is sensed, in response to the determining that the number of the extracted first event signals is less than or equal to the threshold.

The generating the second image may include extracting the stored second event signals from the buffer in an inverse order of time at which an event is sensed, determining a threshold for the second image based on dispersion of the extracted second event signals, determining whether a number of the extracted second event signals is greater than the threshold, and extracting, from the buffer, one or more additional event signals that are stored in the buffer in an inverse order of time at which an event sensed, in response to the determining that the number of the extracted second event signals is less than or equal to the threshold.

The generating the first image may include extracting the stored first event signals from in the buffer in an inverse order of time at which an event is sensed, determining a solid level of the extracted first event signals, determining whether the solid level is less than or equal to a threshold, and extracting, from the buffer, one or more additional event signals that are stored in the buffer in an inverse order of time at which an event is sensed, in response to the determining that the solid level is less than or equal to the threshold.

The aligning may include aligning the second image with the first image through at least one motion of movement, rotation, reduction, and enlargement to generate aligned candidate images.

The aligning may further include determining similarities between the first image and the aligned candidate images, and aligning an aligned candidate image having a maximum similarity, among the similarities, with the first image to generate the third image.

The determining may include determining the similarities based on a sum of values of event signals corresponding to pixels at positions in the first image and positions in the aligned candidate images, among the first event signals and the second event signals, the positions in the first image being same as the positions in the aligned candidate images.

The aligning may include dividing the first image into areas, and moving and/or rotating a portion of the second image such that the portion of the second image is aligned with each of the areas to generate aligned candidate images for each of the areas.

The aligning may include recognizing objects in the first image, and moving and/or rotating a portion of the second image such that the portion of the second image is aligned with each of the objects to generate aligned candidate images for each of the objects.

The aligning may include determining a distance of movement of the second image based on an enlargement ratio or a reduction ratio of the second image to the first image, and moving the second image the distance of the movement to be aligned with the first image.

The aligning may include rotating and moving the second image in three directions of six degrees of freedom based on distance information and an ON event signal or an OFF event signal among the first event signals and the second event signals.

The method may further include removing, from the first event signals and the second event signals, a noise signal that is an event signal farther than a distance from the first event signals and the second event signals.

The method may further include correcting lens distortion of the first event signals and the second event signals by camera calibration.

A non-transitory computer-readable storage medium may store a program including instructions to cause a computer to perform the method.

According to an aspect of another exemplary embodiment, there is provided an image generating apparatus including an event-based vision sensor configured to output first event signals during a first time period and second event signals during a second time period, a buffer configured to store the first event signals and the second event signals, and a processor configured to generate a first image based on the first event signals, generate a second image based on the second event signals, and align the first image and the second image to generate a third image of a quality higher than qualities of the first image and the second image.

Each of the first event signals and the second event signals may include identification information indicating a pixel sensing an event, among pixels included in the event-based vision sensor, and time information indicating a time at which the event is sensed.

The processor may be further configured to extract the stored first event signals from the buffer in an inverse order of time at which an event is sensed, determine a threshold for the first image based on dispersion of the extracted first event signals, determine whether a number of the extracted first event signals is greater than the threshold, and extract, from the buffer, one or more additional event signals that are stored in the buffer in an inverse order of time at which an event is sensed, in response to the determination that the number of the extracted first event signals is less than or equal to the threshold.

The processor may be further configured to extract the stored second event signals from the buffer in an inverse order of time at which an event is sensed, determine a threshold for the second image based on dispersion of the extracted second event signals, determine whether a number of the extracted second event signals is greater than the threshold, and extract, from the buffer, one or more additional event signals that are stored in the buffer in an inverse order of time at which an event is sensed, in response to the determination that the number of the extracted second event signals is less than or equal to the threshold.

The processor may be further configured to extract the stored first event signals from in the buffer in an inverse order of time at which an event is sensed, determine a solid level of the extracted first event signals, determine whether the solid level is less than or equal to a threshold, and extract, from the buffer, one or more additional event signals that are stored in the buffer in an inverse order of time at which an event is sensed, in response to the determination that the solid level is less than or equal to the threshold.

The processor may be further configured to align the second image with the first image through at least one motion of movement, rotation, reduction, and enlargement to generate aligned candidate images.

The processor may be further configured to determine similarities between the first image and the aligned candidate images, and aligning an aligned candidate image having a maximum similarity, among the similarities, with the first image to generate the third image.

The processor may be further configured to determine the similarities based on a sum of values of event signals corresponding to pixels at positions in the first image and positions in the aligned candidate images, among the first event signals and the second event signals, the positions in the first image being same as the positions in the aligned candidate images.

The processor may be further configured to divide the first image into areas, and move and/or rotate a portion of the second image such that the portion of the second image is aligned with each of the areas to generate aligned candidate images for each of the areas.

The processor may be further configured to recognize objects in the first image, and move and/or rotate a portion of the second image such that the portion of the second image is aligned with each of the objects to generate aligned candidate images for each of the objects.

The processor may be further configured to determine a distance of movement of the second image based on an enlargement ratio or a reduction ratio of the second image to the first image, and move the second image the distance of movement to be aligned with the first image.

According to an aspect of another exemplary embodiment, there is provided an image generating method including retrieving, from a buffer, first event signals that are output from an event-based vision sensor during a first time period, in an inverse order of time at which respective first events are sensed, generating a first image based on the retrieved first event signals, retrieving, from the buffer, second event signals that are output from the event-based vision sensor during a second time period, in an inverse order of time at which respective second events are sensed, generating a second image based on the retrieved second event signals, aligning the second image with the first image to generate aligned candidate images, determining similarities between the first image and the aligned candidate images, and aligning an aligned candidate image having a maximum similarity, among the similarities, with the first image to generate the third image.

The method may further include determining a distance of movement of the aligned candidate image having the maximum similarity, based on an enlargement ratio or a reduction ratio of the aligned candidate image to the first image, and the aligning the aligned candidate image may include moving the aligned candidate image the distance of the movement to be aligned with the first image.

BRIEF DESCRIPTION OF THE DRAWINGS

The above and other aspects of exemplary embodiments will become apparent and more readily appreciated from the following detailed description of exemplary embodiments, taken in conjunction with the accompanying drawings of which:

FIG. 6 is a flowchart illustrating a method of generating an image based on a solid level associated with event signals, according to an exemplary embodiment;

DETAILED DESCRIPTION

Figure 1:
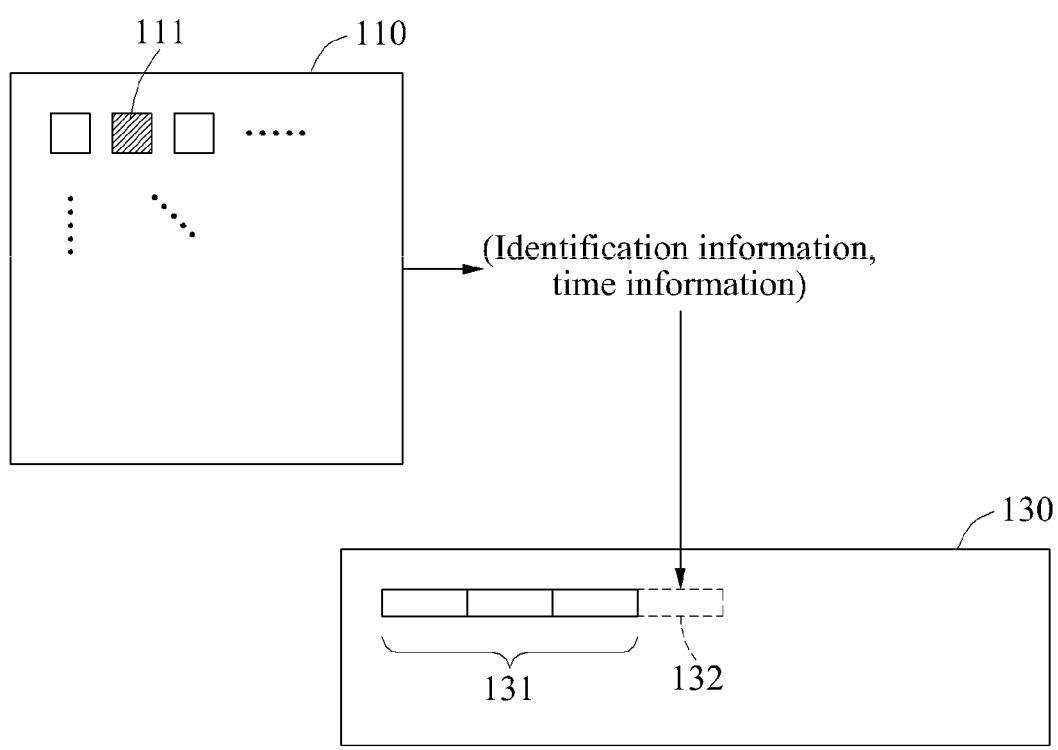
FIG. 1 is a diagram illustrating a method of storing event signals sensed by an event-based vision sensor, in a buffer, according to an exemplary embodiment.

Exemplary embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the exemplary embodiments. However, it is apparent that the exemplary embodiments can be practiced without those specifically defined matters. Also, well-known functions or constructions may not be described in detail because they would obscure the description with unnecessary detail.

It will be understood that the terms such as "unit," "-er (-or)," and "module" described in the specification refer to an element for performing at least one function or operation, and may be implemented in hardware, software, or the combination of hardware and software.

It will be understood that, although the terms first, second, etc. may be used herein to describe various elements, these elements are not limited by these terms. These terms are only used to distinguish one element from another. For example, a first element could be termed a second element, and, similarly, a second element could be termed a first element. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present. Other words used to describe the relationship between elements may be interpreted in a like fashion (e.g., "between," versus "directly between," "adjacent," versus "directly adjacent," etc.).

As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Exemplary embodiments set forth hereinafter may be used to process images photographed by portable phones, smart televisions, or other security monitoring devices.

The exemplary embodiments may be implemented as various types of products, for example, personal computers, laptop computers, tablet computers, smart phones, televisions, smart home appliances, intelligent vehicles, and wearable devices. For example, the exemplary embodiments may be applied to improve the quality of images photographed by a smart phone, a mobile device, and a smart home system. Further, the exemplary embodiments may also be applied to an intelligent automobile system automatically starting up an engine by authenticating a user through a photographed image of the user.

FIG. 1 is a diagram illustrating a method of storing event signals sensed by an event-based vision sensor, in a buffer, according to an exemplary embodiment. Referring to FIG. 1, an event-based vision sensor 110 and a buffer 130 are illustrated.

The event-based vision sensor 110 includes a pixel array. Each pixel included in the pixel array may sense a change in light incident to the corresponding pixel. Hereinafter, the change in light may be a change in an intensity of light. The event-based vision sensor 110 may output event signal(s) corresponding to pixel(s) sensing a change in light.

Unlike a frame-based vision sensor scanning all pixels included in a pixel array on a frame-by-frame basis, the event-based vision sensor 110 may output an event signal only using a pixel sensing a change in light. For example, when an light intensity increasing or decreasing event is sensed by a predetermined pixel, the event-based vision sensor 110 may output an ON event signal or an OFF event signal corresponding to the pixel.

The event-based vision sensor 110 may output an event signal in response to sensing a movement of an object. The object may be a subject. A change in light incident to the event-based vision sensor 110 may result from the movement of the object. For example, in a case in which a light source is fixed and an object does not emit light autonomously, light incident to the event-based vision sensor 110 may be light emitted from the light source and reflected by the object. When the object does not move, light reflected by the stationary object may not change substantially. Thus, the light incident to the event-based vision sensor 110 may not change. Conversely, when the object moves, light reflected by the moving object may change in response to the movement of the object. Thus, the light incident to the event-based vision sensor 110 may change.

The event signal may include identification information and time information. The identification information may be information indicating a pixel 111 sensing an event, in detail, a change in light, among the plurality of pixels included in the event-based vision sensor 110. The identification information may include, for example, coordinates (x,y) or an index of a pixel, and a polarity of the pixel such as an ON or OFF event. The identification information may also be referred to as "positional information."

The time information may indicate a time at which the pixel 111 senses an event. The time information may be, for example, a time stamp indicating a time at which the pixel 111 senses an event.

An event signal generated in each pixel may be matched to each time period and stored in the buffer 130. For example, when event signals corresponding to previous time periods $t_{-2}$ and $t_{-1}$ are stored in a first space 131 of the buffer 130, event signals corresponding to a current time period $t_0$ are stored in a second space 132 of the buffer 130.

For example, the first space 131 and the second space 132 may be configured by a data structure in a form of a linked list, a stack, or a queue.

Figure 2:
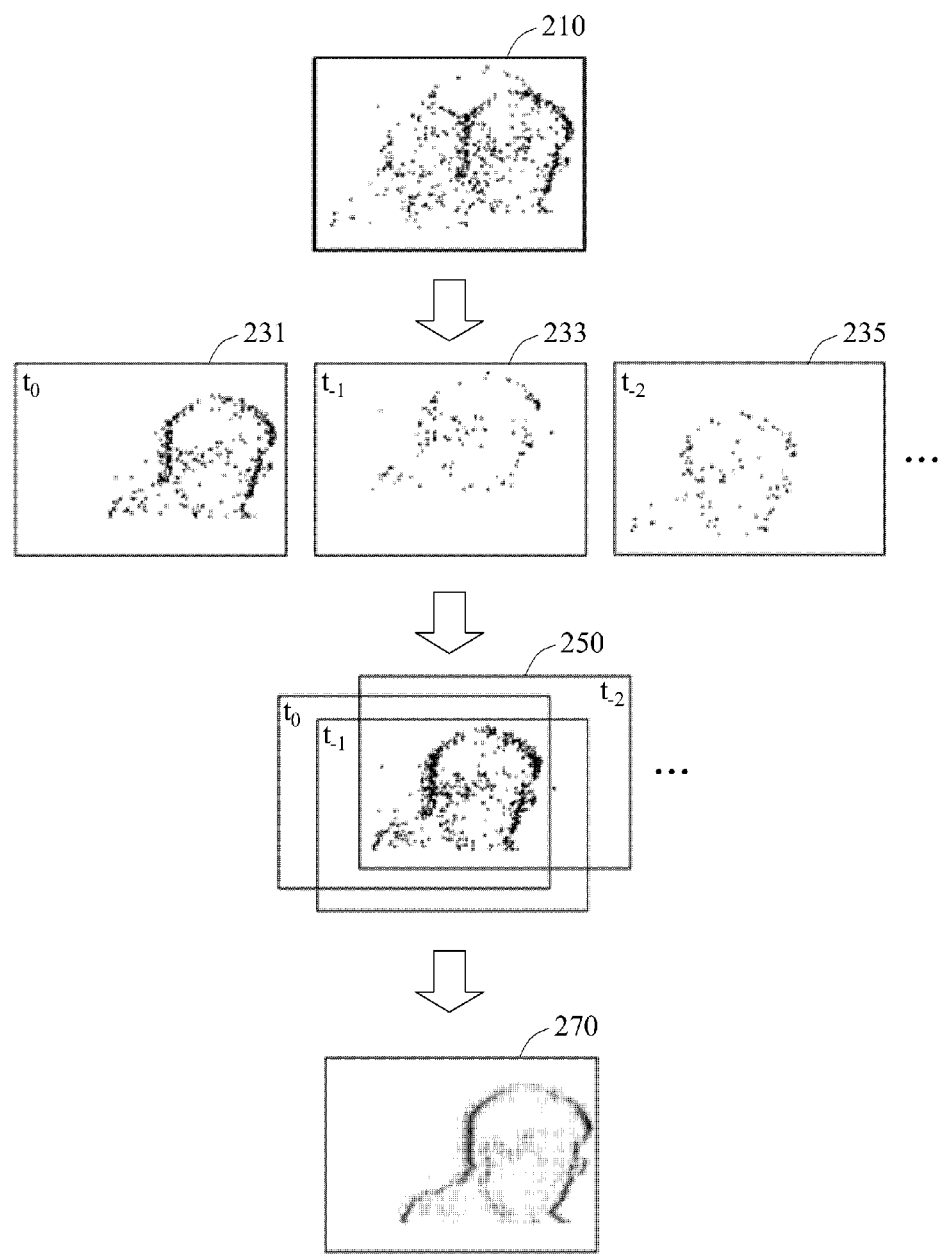
FIG. 2 is a diagram illustrating an image generating method according to an exemplary embodiment.

FIG. 2 is a diagram illustrating an image generating method according to an exemplary embodiment. Referring to FIG. 2, a process of generating a high-quality image from images corresponding to event signals stored in a buffer using an image generating apparatus according to an exemplary embodiment is illustrated.

The buffer may be configured to store event signals corresponding to time periods accumulated from a previous time period $t_{-2}$ to a recent time period $t_0$. An image 210 may be an image generated based on the event signals corresponding to the time periods accumulated from the previous time period $t_{-2}$ to the recent time period $t_0$.

The image generating apparatus may generate images corresponding to each time period by extracting event signals stored in the buffer in an inverse order of time at which an event is sensed. For example, the image generating apparatus may generate an image 231 based on event signals corresponding to the recent time period $t_0$. The image 231 may be referred to as a "first image" or "seed image."

Similarly, the image generating apparatus may generate an image 233 corresponding to a time period $t_{-1}$ by extracting event signals corresponding to the time period $t_{-1}$, and generate an image 235 corresponding to a time period $t_{-2}$ by extracting event signals corresponding to the time period $t_{-2}$. In this example, the images 233 and 235 generated based on the event signals corresponding to the remaining time periods $t_{-1}$ and $t_{-2}$, excluding the recent time period $t_0$, may be referred to as "second images" or "fragment images." A number of the event signals corresponding to the recent time period $t_0$ may be greater than a number of the event signals corresponding to each of the remaining time periods $t_{-1}$ and $t_{-2}$. In detail, a number of the event signals used to generate the first image may be greater than a number of the event signals used to generate each of the second images.

The image generating apparatus may generate an aligned image 250 by aligning the second images 233 and 235 with the first image 231. For example, the images 231, 233, and 235 may correspond to changes in light occurring due to a movement of a user four seconds ago, a movement of the user two seconds ago, and a movement of the user at a current time. Positions of the user shown in the images 231, 233, and 235 may differ from each other due to the movements of the user. The image generating apparatus may generate the aligned image 250 by repositioning the second images 233 and 235 through movement, rotation, reduction, and enlargement, and aligning the repositioned second images 233 and 235 with the first image 231.

The image generating apparatus may align the second images 233 and 235 with the entire first image 231, or may divide the first image 231 into a plurality of areas and align the second images 233 and 235 with each of the divided areas. The image generating apparatus may align the second images 233 and 235 with each of a plurality of objects included in the first image 231.

An example of aligning the second images 233 and 235 with each of the divided areas of the first image 231 using the image generating apparatus will be described with reference to FIG. 9, and an example of aligning the second images 233 and 235 with each of the plurality of objects included in the first image 231 using the image generating apparatus will be described with reference to FIG. 10.

The image generating apparatus may acquire, based on the aligned image 250, a final image 270 of a higher quality than those of the first image 231 and the second images 233 and 235.

Figure 3:
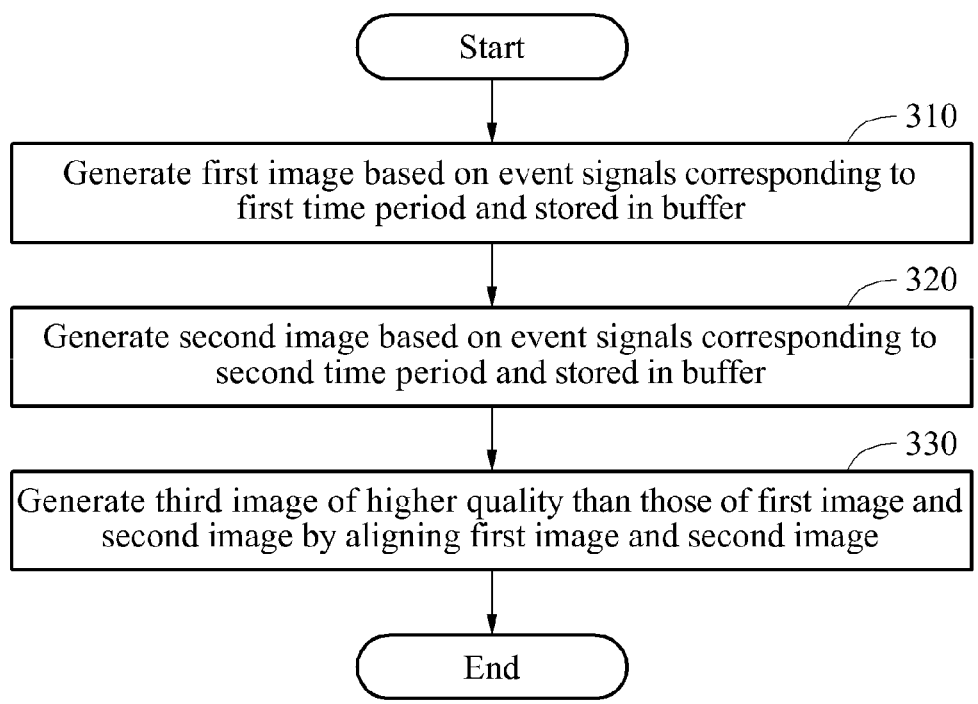
FIG. 3 is a flowchart illustrating an image generating method according to an exemplary embodiment.

FIG. 3 is a flowchart illustrating an image generating method according to an exemplary embodiment. Referring to FIG. 3, in operation 310, an image generating apparatus according to an exemplary embodiment generates a first image based on event signals corresponding to a first time period and stored in a buffer. In this example, the first time period may correspond to a recent time period. A time period may be preset or dynamically updated. Event signals corresponding to a time period may be event signals received during a predetermined time period. Each event signal may include identification information, for example, positional information, and/or time information.

In operation 320, the image generating apparatus generates a second image based on event signals corresponding to a second time period and stored in the buffer. The second time period may correspond to a remaining time period excluding the recent time period. A single second image or a plurality of second images may be generated.

The image generating apparatus may generate the first image or the second image based on event signals extracted in an inverse order of time at which an event is sensed, among event signals stored in the buffer.

As described above, an event-based vision sensor may output an event signal in response to a movement of an object or a change in light. Thus, a relatively large number of event signals may be output during the same time period as a speed of the movement of the object or the change in light increases. Accordingly, when extracting event signals using a fixed time period, an inappropriate number of event signals may be extracted based on the speed of the movement of the object or the change in light.

The image generating apparatus may generate an image based on the extracted event signals. Thus, in a case in which an inappropriate number of event signals are extracted, the quality of generated image may decrease. The image generating apparatus may determine whether the number of the extracted event signals is appropriate. For example, the image generating apparatus may determine whether the number of the extracted event signals is appropriate based on a positional relationship of the event signals. The positional relationship of the event signals refers to a relationship between positions corresponding to the event signals, and may include, for example, a distribution aspect of the positions of the event signals, a scattering level of the positions of the event signals, and a density of the positions of the event signals. The image generating apparatus may determine whether the number of the extracted event signals is appropriate by comparing the number of the extracted event signals to a threshold determined based on the positional relationship of the event signals.

The image generating apparatus may determine whether the number of the extracted event signals is appropriate based on dispersion of the event signals. A method of generating an image, for example, a first image or a second image, based on dispersion of event signals using the image generating apparatus will be described with reference to FIGS. 4 and 5.

The image generating apparatus may determine whether the number of the extracted event signals is appropriate based on a solid level associated with the event signals. A method of generating an image, for example, a first image or a second image, based on a solid level associated with event signals using the image generating apparatus will be described with reference to FIGS. 6 through 7.

In operation 330, the image generating apparatus generates a third image of a higher quality than those of the first image and the second image by aligning the first image and the second image. The image generating apparatus may set a movement distance of the second image based on an enlargement ratio or a reduction ratio of the second image to the first image, and generate aligned candidate images by moving the second image the set movement distance to be aligned with the first image. The image generating apparatus may align the first image and the second image by rotating and moving the second image in three directions of six degrees of freedom (6DoF) based on distance information and an ON event signal or an OFF event signal among the event signals, thereby generating the third image. A method of generating a third image using the image generating apparatus will be described with reference to FIG. 8.

Figure 4:
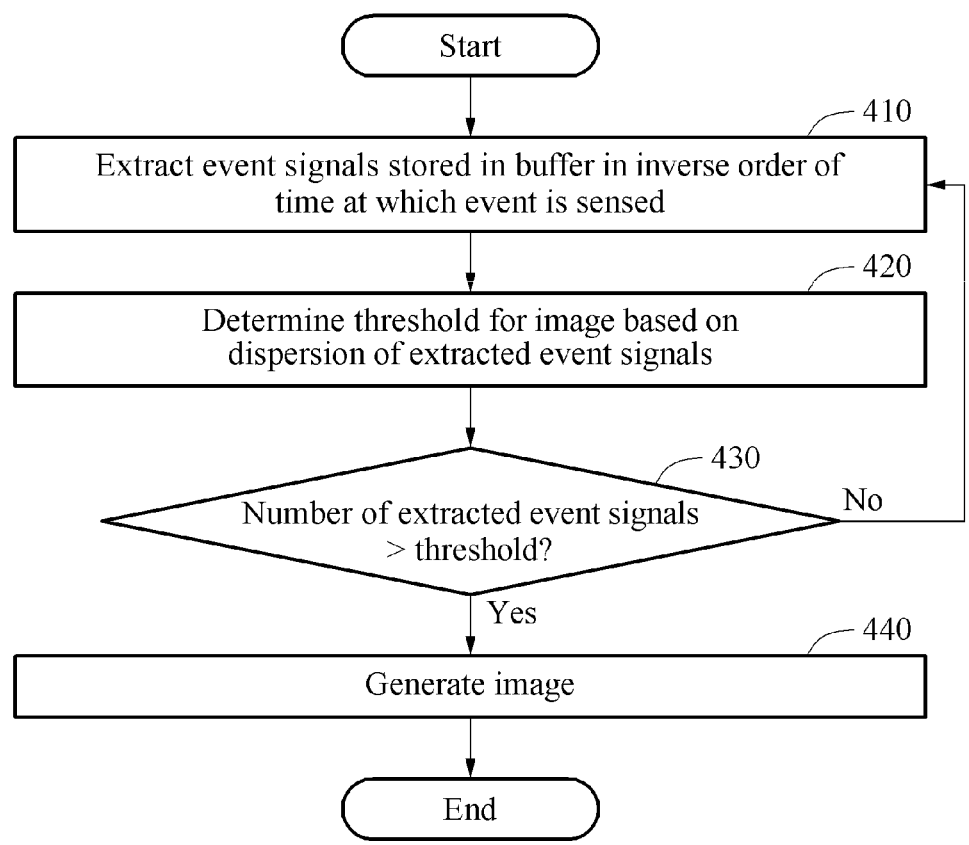
FIG. 4 is a flowchart illustrating a method of generating an image based on dispersion of event signals, according to an exemplary embodiment.

FIG. 4 is a flowchart illustrating a method of generating an image based on dispersion of event signals, according to an exemplary embodiment. Referring to FIG. 4, in operation 410, an image generating apparatus according to an exemplary embodiment extracts event signals stored in a buffer in an inverse order of time at which an event is sensed. For example, in a case in which an event signal sensed just now, an event signal sensed two seconds ago, and an event signal sensed four seconds ago are stored in the buffer, the image generating apparatus may extract the event signals in an inverse order of time at which an event is sensed, for example, in an order of the event signal sensed just now, and the event signal sensed two seconds ago, and the event signal sensed four seconds ago.

In operation 420, the image generating apparatus determines a threshold for a first image or second image based on dispersion of the extracted event signals. A method of determining a threshold for a first image or second image based on dispersion of event signals using the image generating apparatus will be described with reference to FIG. 5.

The image generating apparatus may determine whether an event signal is to be additionally extracted from the buffer by comparing a number of the extracted event signals to the threshold. In operation 430, the image generating apparatus determines whether the number of the extracted event signals is greater than the threshold.

In response to the determination that the number of the extracted event signals is greater than the threshold, the image generating apparatus continues in operation 440. Conversely, in response to the determination that the number of the extracted event signals is less than or equal to the threshold, the image generating apparatus returns to operation 410.

In operation 440, the image generating apparatus generates an image based on the currently extracted event signals.

Figure 5:
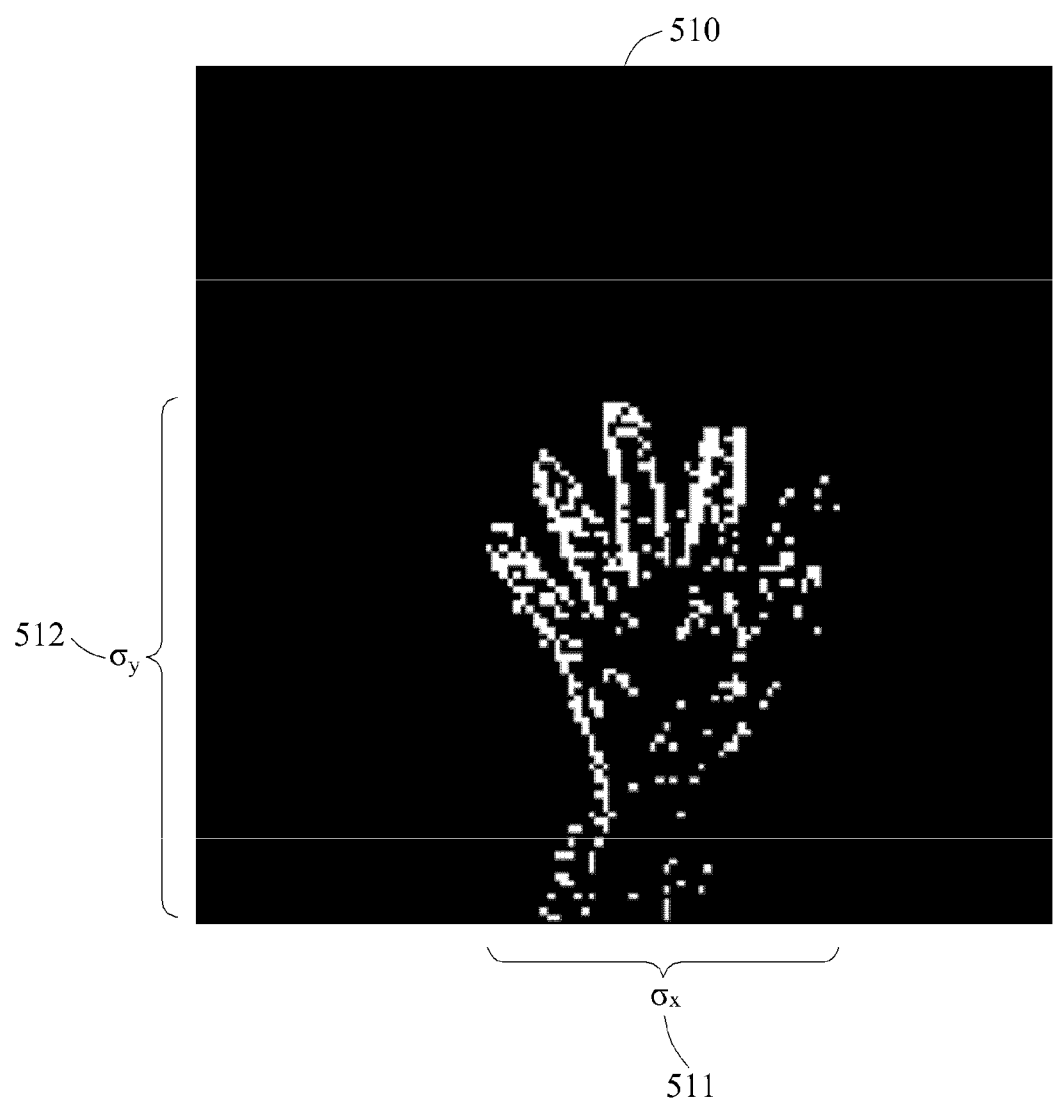
FIG. 5 is a diagram illustrating a method of determining a threshold for an image based on dispersion of event signals, according to an exemplary embodiment.

FIG. 5 is a diagram illustrating a method of determining a threshold for an image based on dispersion of event signals, according to an exemplary embodiment. An image generating apparatus according to an exemplary embodiment may calculate dispersion associated with event signals by measuring a number of event signals corresponding to a predetermined time period. Referring to FIG. 5, the image generating apparatus may calculate x-axial dispersion $\sigma_x$ 511 and y-axial dispersion $\sigma_y$ 512 based on positional information included in event signals 510. The x-axial dispersion $\sigma_x$ 511 may indicate a level of distribution of the event signals 510 in an x-axial direction, and the y-axial dispersion $\sigma_y$ 512 may indicate a level of distribution of the event signals 510 in a y-axial direction.

The image generating apparatus may compare the number of the event signals to a dispersion-based threshold. In this example, the dispersion-based threshold may be a first threshold for a first image, or a second threshold for a second image.

The dispersion-based threshold may be a threshold determined based on dispersion. The dispersion-based threshold may be expressed by a function $f(\sigma_x, \sigma_y)$ of the x-axial dispersion $\sigma_x$ 511 and the y-axial dispersion $\sigma_y$ 512. The function $f(\sigma_x, \sigma_y)$ may be set in any of various ways. For example, the function $f(\sigma_x, \sigma_y)$ may be set as expressed by Equation 1.

$$f(\sigma_x,\sigma_y)=\alpha \cdot \sigma_x \cdot \sigma_y \quad \text{[Equation 1]}$$

In Equation 1, $\alpha$ is a predetermined constant. When the number of the event signals is greater than a value of the function $f(\sigma_x, \sigma_y)$, the image generating apparatus may determine that the number of the extracted event signals is appropriate for generating an image, and generate an image based on the extracted event signals.

To efficiently calculate Equation 1, the image generating apparatus may use an algorithm as shown in Table 1. In Table 1, it is assumed that $\alpha$ is "2."

TABLE 1

```
reset the image canvas
alpha = 2
a = 0
b = 0
c = 0
d = 0
e = 0
f = 0
g = 0
h = 0
i = 0
do until a<alpha*e*i {
    get next event's position (x,y)
    a = a + 1
    b = x - c
    c = c + b / a
    d = d + b * ( x - c )
    e = sqrt( d / ( a - 1 ) )
    f = y - g
    g = g + f / a
    h = h + f * ( y - g )
    i = sqrt( h / ( a - 1 ) )
}
return an image from the events above
```

FIG. 6 is a flowchart illustrating a method of generating an image based on a solid level associated with event signals, according to an exemplary embodiment. Referring to FIG. 6, in operation 610, an image generating apparatus according to an exemplary embodiment extracts event signals stored in a buffer in an inverse order of time at which an event is sensed. In operation 620, the image generating apparatus determines a solid level associated with the extracted event signals. The image generating apparatus may determine whether a number of the extracted event signals is appropriate based on the solid level associated with the event signals. A method of determining a solid level using the image generating apparatus will be described with reference to FIGS. 7A and 7B.

The image generating apparatus may determine whether an event signal is to be additionally extracted from the buffer by comparing the solid level to a preset threshold. In operation 630, the image generating apparatus determines whether the determined solid level is greater than the threshold. In response to the determination that the solid level is greater than the threshold, the image generating apparatus continues in operation 640. Conversely, in response to the determination that the solid level is less than or equal to the threshold, the image generating apparatus returns to operation 610.

In operation 640, the image generating apparatus generates an image based on the currently extracted event signals.

Figure 7A:
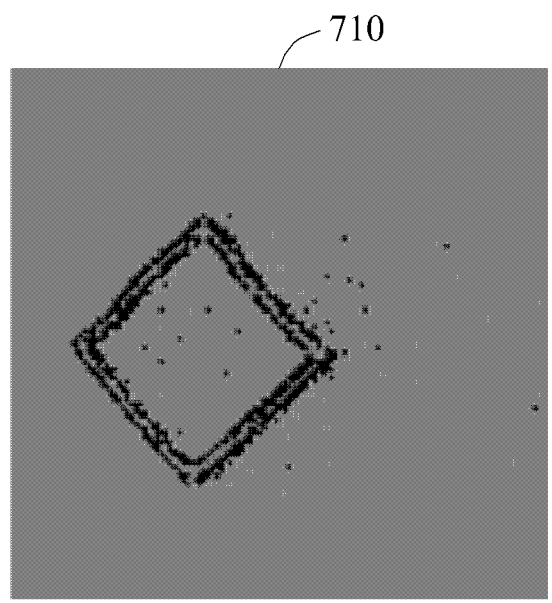
FIGS. 7A and 7B are diagrams illustrating a solid level associated with event signals, according to an exemplary embodiment.
Figure 7B:
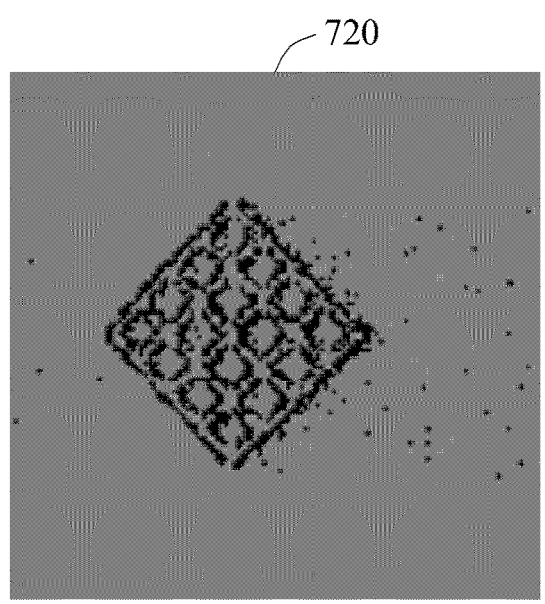

FIGS. 7A and 7B are diagrams illustrating a solid level associated with event signals, according to an exemplary embodiment. As described above, the image generating apparatus may determine whether a number of collected event signals is appropriate based on a solid level associated with the event signals. The solid level may be a parameter calculated based on a positional relationship of the event signals. The solid level may be a parameter indicating a solidity of the event signals. For example, the solid level may be a measure indicating a density of positions of the collected event signals. The solid level may be a measure indicating a sharpness level of a shape generated by the collected event signals. In an example, the solid level may be a parameter having a value increasing when a number of ambient events corresponding to a predetermined event signal is greater than a predetermined value, and decreasing when the number of the ambient events corresponding to the predetermined event signal is less than the predetermined value. In this example, a position of the predetermined event signal may be determined based on positional information of the corresponding event signal, and event signals included in a predetermined area in a vicinity of the determined position may be determined to be ambient event signals.

The image generating apparatus may accumulate and store the event signals. For example, the image generating apparatus may accumulate and store the event signals using an event map including elements corresponding to a pixel array of an event-based vision sensor. A value of each element included in the event map may be initialized to "0." The image generating apparatus may set a value of an element corresponding to a received event signal to "1" based on positional information of the received event signal.

The image generating apparatus may calculate a solid level based on a stored cumulative result. For example, the image generating apparatus may calculate a solid level s using Equation 2. The solid level s may be initialized to be a predetermined value, and updated through Equation 2. The solid level s may have a value ranging between "0" and "1."

$$\Delta s = \gamma(H((\Sigma_i m(e,i)) - \theta) - s) \quad [\text{Equation 2}]$$

In Equation 2, Δs denotes a variation in the solid level, and γ denotes a decision sensitivity. γ may be a constant between "0" and "1." H(•) denotes a Heaviside step function. When an internal value is greater than "0," H(•) may be "1." When the internal value is less than or equal to "0," H(•) may be "0."

m denotes an event map. When an i-th neighboring element of an element corresponding to a predetermined event signal e in the event map m is set to "1," m(e,i) may be "1." Otherwise, m(e,i) may be "0." θ denotes a threshold.

The image generating apparatus may compare the solid level to a predetermined threshold or threshold level, for example, 0.4. For example, when the solid level is greater than the threshold, the image generating apparatus may determine that a number of the extracted event signals is appropriate to generate an image, and generate an image based on the extracted event signals.

Referring to FIGS. 7A and 7B, the image generating apparatus may extract, based on the solid level, a number of event signals appropriate for both a case 710 in which an object has a simple pattern, and a case 720 in which an object has a complex pattern.

For example, the image generating apparatus may extract a number of event signals appropriate for each case by setting a threshold corresponding to a solid level of the case 720 to be higher than a threshold corresponding to a solid level of the case 710.

The image generating apparatus may generate an image when an appropriate number of event signals are extracted, as described above. In this example, the extracted event signals include positional information. Thus, points corresponding to the event signals may be arranged on a two-dimensional (2D) plane based on the corresponding positional information. For example, images as shown in FIGS. 7A and 7B may be generated. The image generating apparatus may apply various image processing schemes, for example, noise filtering and edge detection, to the generated image.

Figure 8:
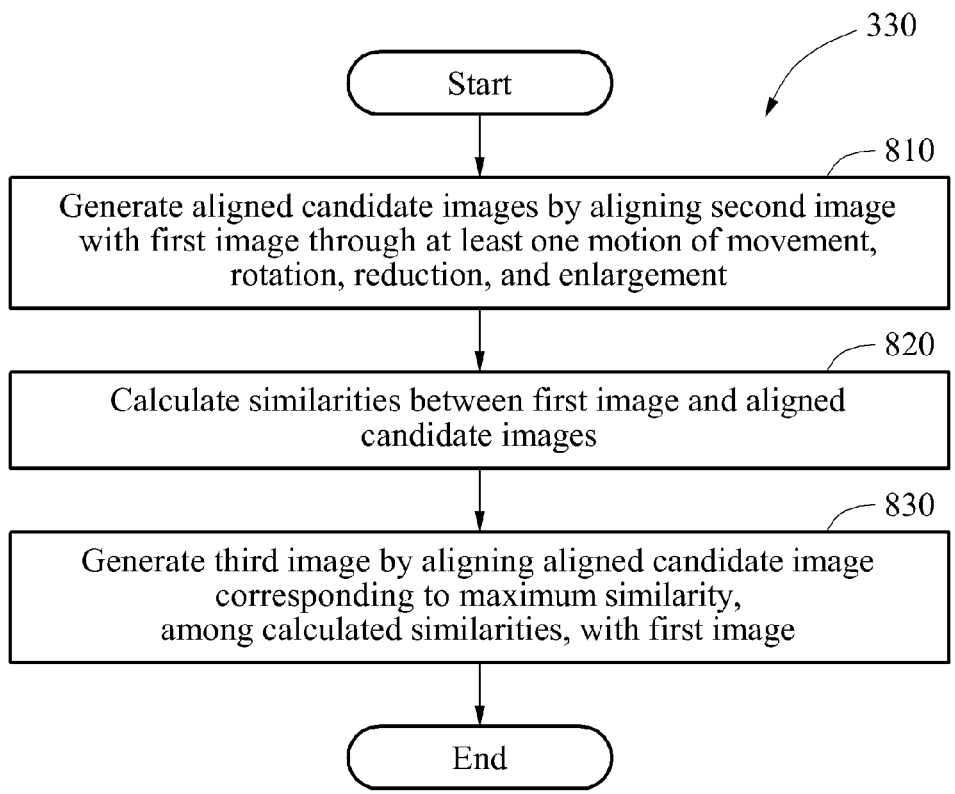
FIG. 8 is a flowchart illustrating a method of generating a third image, according to an exemplary embodiment.

FIG. 8 is a flowchart illustrating a method of generating a third image, according to an exemplary embodiment. Referring to FIG. 8, in operation 810, an image generating apparatus according to an exemplary embodiment generates aligned candidate images by aligning a second image with a first image through at least one motion of movement, rotation, reduction, and enlargement. For example, the image generating apparatus may generate aligned candidate images by aligning a second image corresponding to a time period $t_{-1}$, a second image corresponding to a time period $t_{-2}$, and a second image corresponding to a time period $t_{-3}$ with the first image through at least one motion of movement, rotation, reduction, and enlargement.

In operation 820, the image generating apparatus calculates similarities between the first image and the aligned candidate images. For example, the image generating apparatus may calculate the similarities based on a sum of values of event signals corresponding to pixels at the same positions in the first image and the aligned candidate images, in detail, a sum of products of pixel values. In an example, the image generating apparatus may set a value of an event signal to "1" when a first event corresponding to a pixel in the first image and a second event corresponding to pixel in the aligned candidate images exist, the pixel in the first image and the pixel in the aligned candidate images being at the same position. The image generating apparatus may set the value of the event signal to "0" when any of the first event and the second event is absent. In another example, the image generating apparatus may set a value of an event signal to "+1" when event signals respectively corresponding to pixels at the same positions in the first image and the aligned candidate images are identical, for example, when the event signals respectively correspond to ON/ON signals or OFF/OFF signals, to "−1" when the event signals are different from each other, and to "0" when event signals respectively corresponding to the pixels at the same positions in the images are not generated. The image generating apparatus may calculate a sum of the values of the event signals as a similarity. For example, if the pixels at the same positions in the images have different polarities (that is, if a pixel gets brighter and another pixel gets darker), the similarity between the pixels may be set to a negative (−) value to decrease the overall similarity.

In operation 830, the image generating apparatus generates a third image by aligning an aligned candidate image corresponding to a maximum similarity, among the calculated similarities, with the first image.

In an example, the image generating apparatus may provide the aligned candidate images generated in operation 810 to a complementary metal-oxide semiconductor (CMOS) image sensor (CIS) such that the aligned candidate images may be used for image processing such as deblurring, for example.

Figure 9:
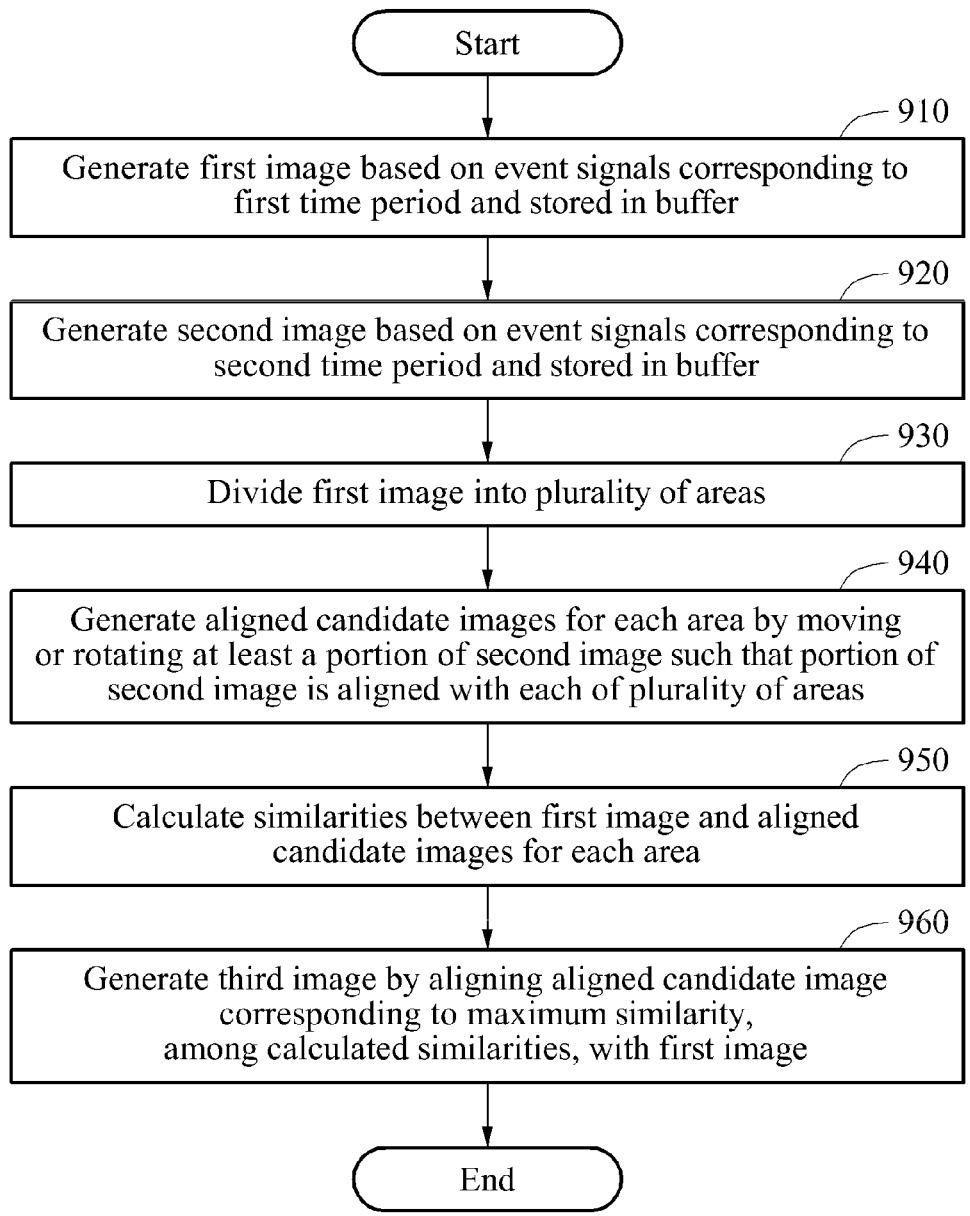
FIGS. 9, 10, 11, and 12 are flowcharts illustrating image generating methods according to exemplary embodiments.

FIGS. 9, 10, 11, and 12 are flowcharts illustrating image generating methods according to exemplary embodiments. Referring to FIG. 9, operations 910 and 920 are the same as operations 310 and 320 of FIG. 3, and thus duplicated descriptions will be omitted here for conciseness.

When a first image and a second image are generated in operations 910 and 920, in operation 930, an image generating apparatus according to an exemplary embodiment divides the first image into a plurality of areas. The image generating apparatus may divide the first image into a predetermined number of areas, for example, four areas or nine areas. The image generating apparatus may divide the first image into areas of the same sizes, or into areas of different sizes. The image generating apparatus may divide the first image into a plurality of areas based on depth information.

In operation 940, the image generating apparatus generates aligned candidate images for each area by moving or rotating at least a portion of the second image such that the portion of the second image is aligned with each of the plurality of areas. In this example, the portion of the second image may be in a size corresponding to each of the plurality of areas, or may be in a size greater than or smaller than the plurality of areas.

In operation 950, the image generating apparatus calculates similarities between the first image and the aligned candidate images for each area. The image generating apparatus may calculate the similarities based on a sum of values of event signals corresponding to the same positions in the first image and the aligned candidate images, in detail, a sum of products of pixel values.

In operation 960, the image generating apparatus generates a third image by aligning an aligned candidate image corresponding to a maximum similarity, among the calculated similarities, with the first image.

Figure 10:
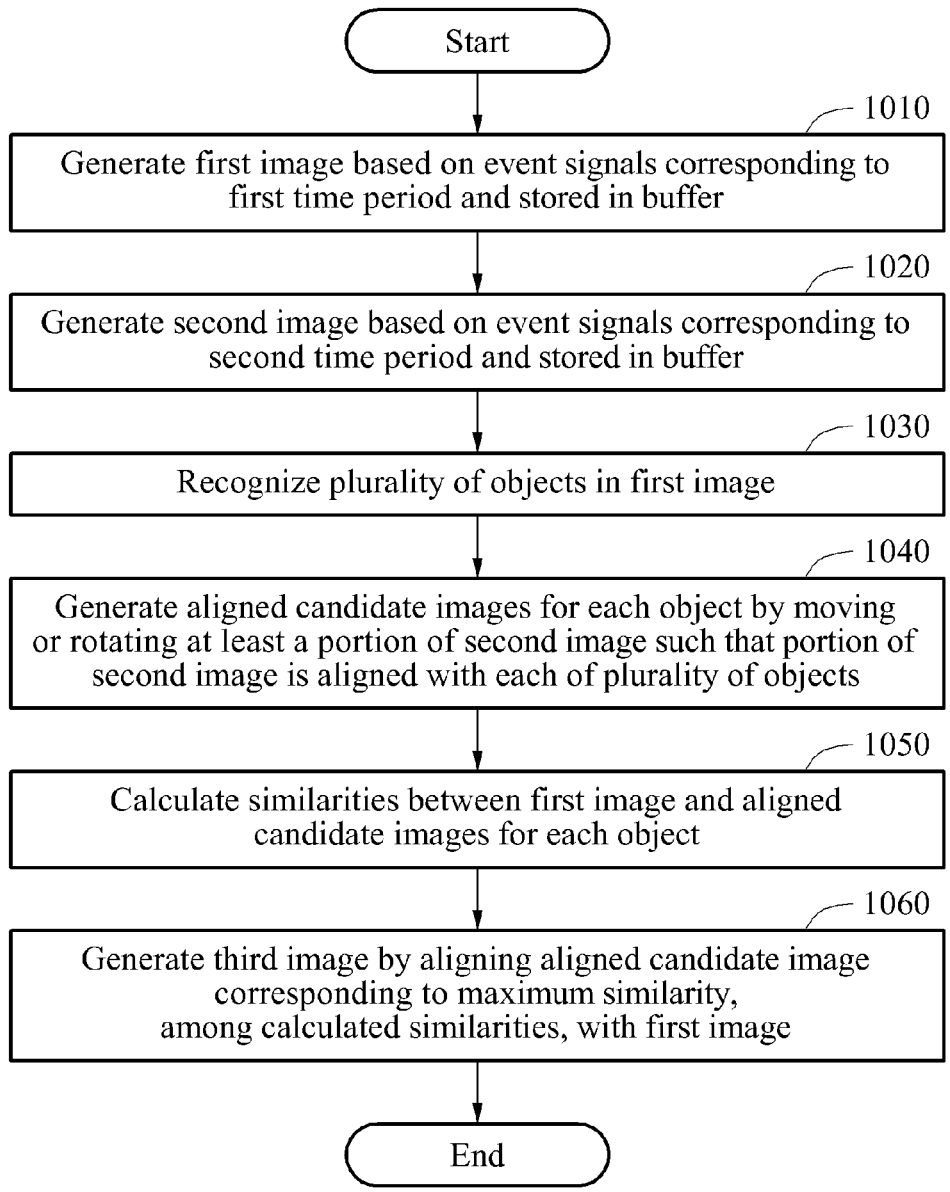

Referring to FIG. 10, operations 1010 and 1020 are the same as operations 310 and 320 of FIG. 3, and thus duplicated descriptions will be omitted here for conciseness.

When a first image and a second image are generated in operations 1010 and 1020, in operation 1030, an image generating apparatus according to an exemplary embodiment recognizes a plurality of objects in the first image. The image generating apparatus may recognize the objects using various schemes of recognizing an object in an image. For example, the image generating apparatus may recognize an object in an image using a training-based classifier. When the recognized object is classified as one among preregistered object types, the image generating apparatus may determine that object recognition has succeeded. Conversely, when the recognized object does not correspond to any of the preregistered object types, the image generating apparatus may determine that the object recognition has failed. In response to determination that the object recognition has succeeded, the image generating apparatus may output a recognition result. The recognition result may be an ID indicating an object type. The image generating apparatus may recognize the plurality of objects in the first image by classifying classes of the objects included in the first image based on event signals corresponding to a first time period, and determining a class of an object to which an event signal corresponding to the first time period belongs based on a mean value of the classes of the objects.

In operation 1040, the image generating apparatus generates aligned candidate images for each object by moving or rotating at least a portion of the second image such that the portion of the second image is aligned with each of the plurality of objects.

In operation 1050, the image generating apparatus calculates similarities between the first image and the aligned candidate images for each object. The image generating apparatus may calculate the similarities based on a sum of values of event signals corresponding to pixels at the same positions in the first image and the aligned candidate images for each object, in detail, a sum of products of pixel values.

In operation 1060, the image generating apparatus generates a third image by aligning an aligned candidate image corresponding to a maximum similarity, among the calculated similarities, with the first image.

Figure 11:
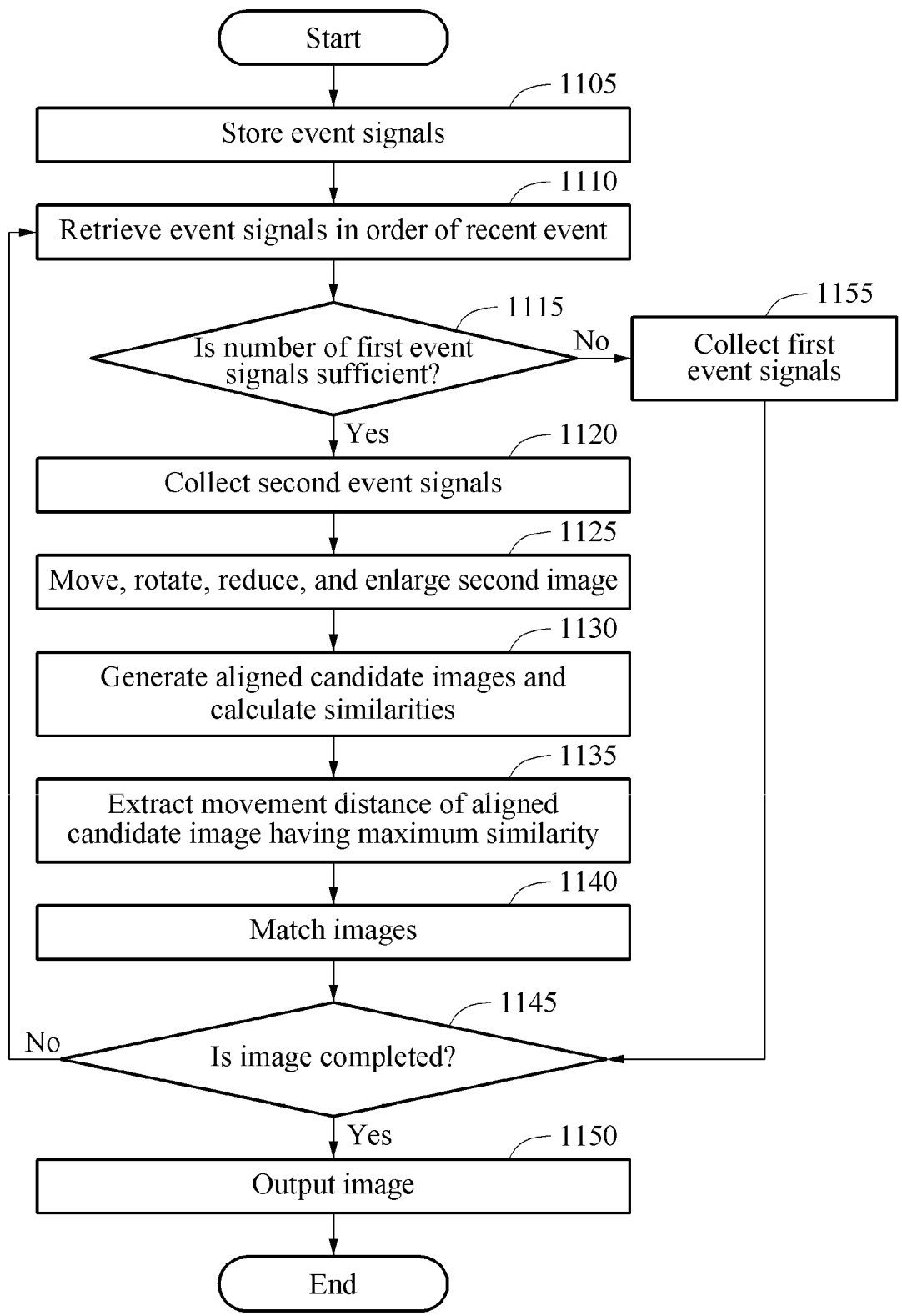

Referring to FIG. 11, in operation 1105, an image generating apparatus according to an exemplary embodiment stores event signals. The image generating apparatus may store the event signals in a memory or a buffer, for example.

In operation 1110, the image generating apparatus retrieves or extracts the stored event signals in an order of recent event. In operation 1115, the image generating apparatus determines whether a number of retrieved first event signals is sufficient to generate a first image. The image generating apparatus may determine whether the number of the first event signals is sufficient to generate the first image based on dispersion of the retrieved event signals or a solid level associated with the retrieved event signals as described above. Here, the first event signals refer to event signals corresponding to a first time period. For example, the image generating apparatus may calculate horizontal dispersion and vertical dispersion of the first event signals. The image generating apparatus may store the first image as an initial aligned image when the number of the first event signals is greater than, for example, a value obtained by calculating (horizontal dispersion×vertical dispersion×predefined constant).

In response to the determination that the number of the first event signals is sufficient, the image generating apparatus continues in operation 1120. In response to the determination that the number of the first event signals is insufficient, the image generating apparatus continues in operation 1155.

In operation 1120, the image generating apparatus collects second event signals. Here, the second event signals refer to event signals corresponding to a second time period. The image generating apparatus may generate a second image based on the second event signals. Similarly, the image generating apparatus may calculate horizontal dispersion and vertical dispersion of the second event signals, and determine whether a number of the second event signals is sufficient to generate the second image.

In operation 1125, the image generating apparatus transforms the second image, for example, through movement, rotation, reduction, and enlargement. In operation 1130, the image generating apparatus generates aligned candidate images by aligning transformed second images and the first image, and calculate similarities between the first image and the aligned candidate images.

In operation 1135, the image generating apparatus extracts a movement distance of an aligned candidate image having a maximum similarity, among the calculated similarities.

In operation 1140, the image generating apparatus matches or aligns the aligned candidate image having the maximum similarity with the first image by moving the aligned candidate image based on the extracted movement distance.

In operation 1145, the image generating apparatus determines whether an image is completed. For example, the image generating apparatus may determine whether the image is completed based on a quality of the image, or based on a number of event signals remaining in the buffer. In response to the determination that the image is yet to be completed, the image generating apparatus returns to operation 1110, and retrieves or extracts event signals in an order of recent event. In response to the determination that the image is completed, the image generating apparatus continues in operation 1150. In operation 1150, the image generating apparatus outputs the image.

In operation 1155, the image generating apparatus additionally collect first event signals, and continues in operation 1145.

Figure 12:
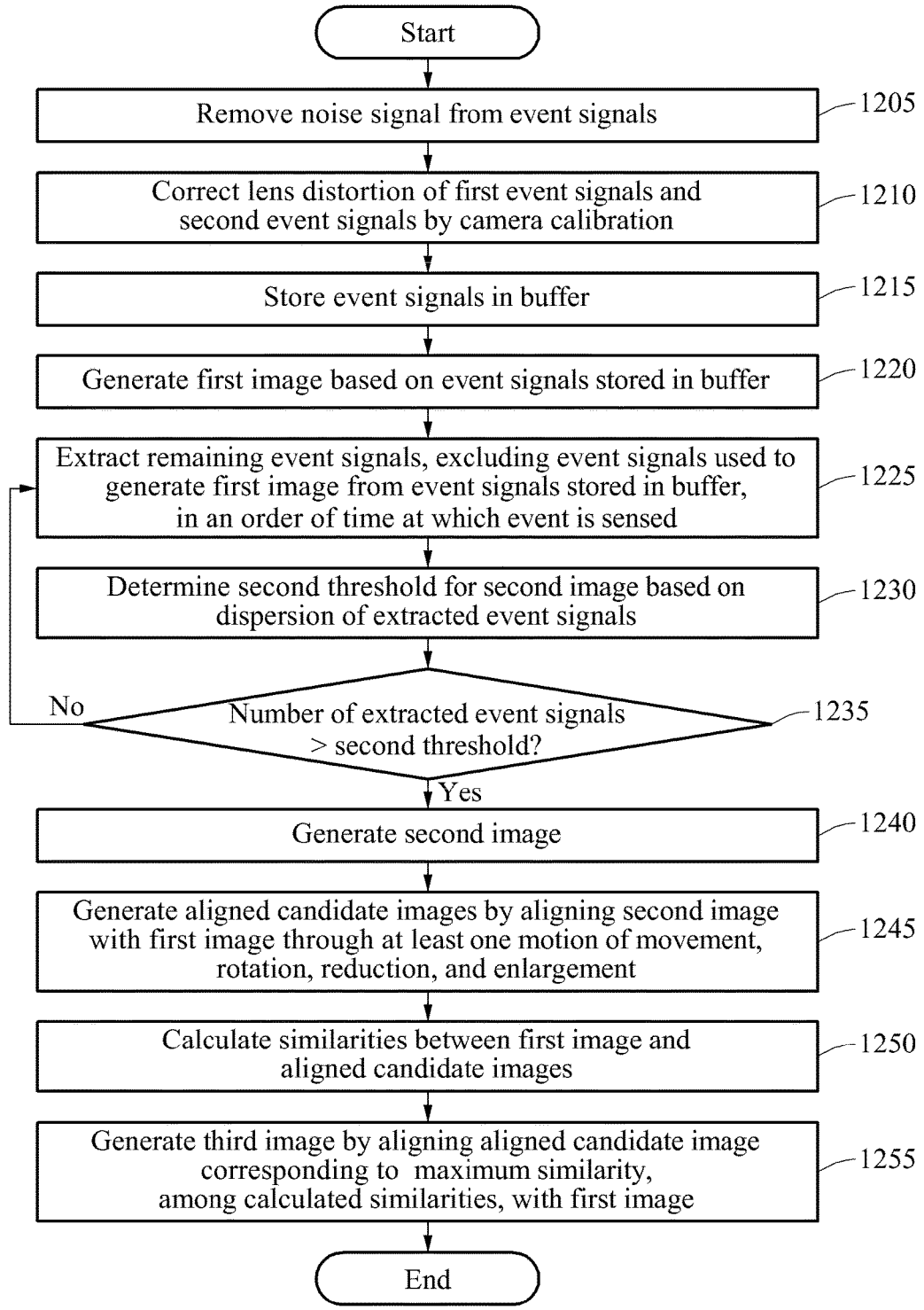

Referring to FIG. 12, in operation 1205, an image generating apparatus according to an exemplary embodiment removes a noise signal from event signals sensed in each time period by an event-based vision sensor. The image generating apparatus may remove the noise signal from the event signals based on whether an event signal is generated outside a predetermined distance from first event signals and second event signals that are present within a predetermined time period. That is, the image generating apparatus may determine that an event signal solely sensed to be spaced farther than a predetermined distance apart from each event signal is an incorrectly sensed noise signal, and remove the noise signal.

In operation 1210, the image generating apparatus corrects lens distortion of event signals remaining after the noise signal is removed, in detail, first event signals and second event signals remaining after the noise signal is removed, by camera calibration.

In operation 1215, the image generating apparatus stores the lens distortion-corrected event signals in the buffer.

In operation 1220, the image generating apparatus generates a first image based on the event signals stored in the buffer. In operation 1225, the image generating apparatus extracts remaining event signals excluding the event signals used to generate the first image, from the event signals stored in the buffer, in an inverse order of time at which an event is sensed.

In operation 1230, the image generating apparatus determines a second threshold for a second image based on dispersion of the extracted event signals. The image generating apparatus may determine whether an event signal is to be additionally extracted from the buffer based on a result of comparing a number of the extracted event signals to the second threshold.

In operation 1235, the image generating apparatus determines whether the number of the extracted event signals is greater than the second threshold. In response to the determination that the number of the extracted event signals is less than or equal to the second threshold, the image generating apparatus returns to operation 1225. Conversely, in response to the determination that the number of the extracted event signals is greater than the second threshold, the image generating apparatus continues in operation 1240.

In operation 1240, the image generating apparatus generates the second image based on the currently extracted event signals.

In operation 1245, the image generating apparatus generates aligned candidate images by aligning the second image with the first image through at least one motion of movement, rotation, reduction, and enlargement.

In operation 1250, the image generating apparatus calculates similarities between the first image and the aligned candidate images. In operation 1255, the image generating apparatus generates a third image by aligning an aligned candidate image corresponding to a maximum similarity, among the calculated similarities, with the first image.

Figure 13:
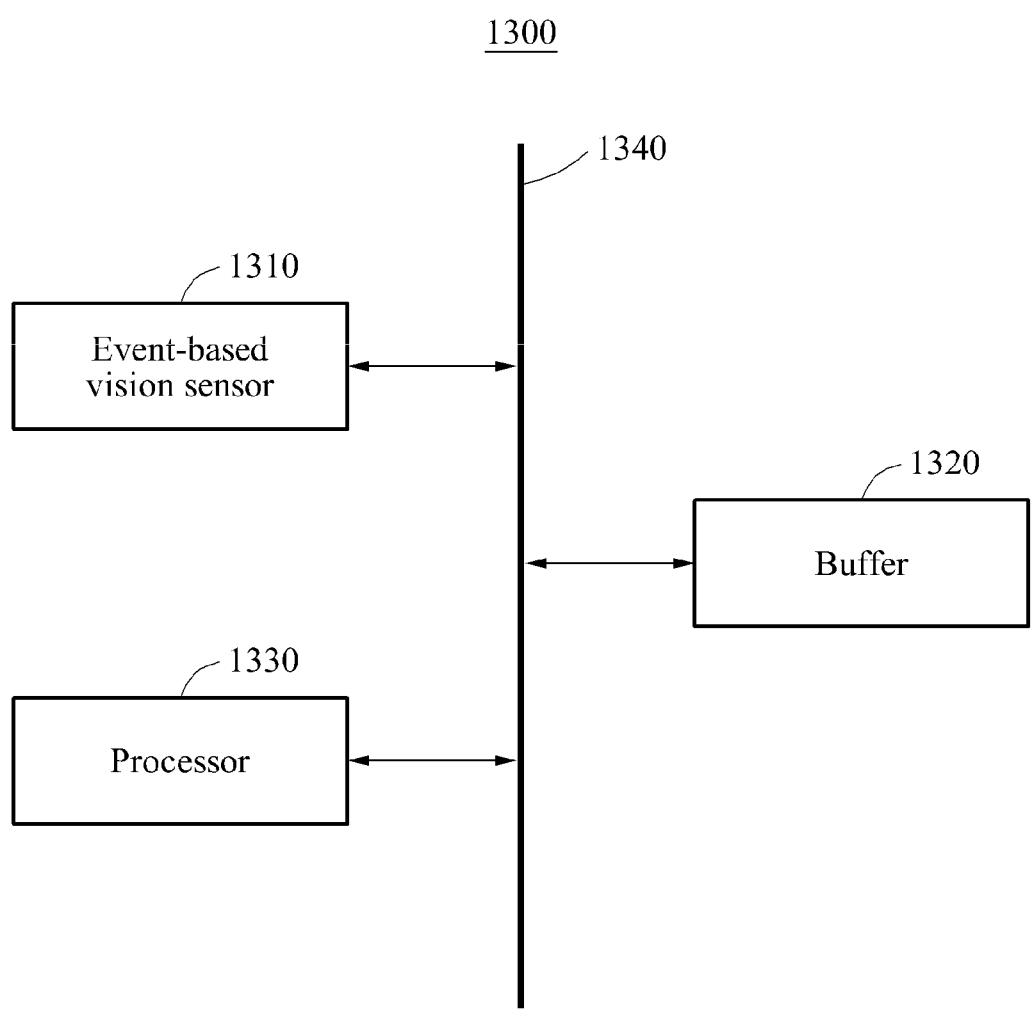
FIGS. 13 and 14 are block diagrams illustrating image generating apparatuses according to exemplary embodiments.
Figure 14:
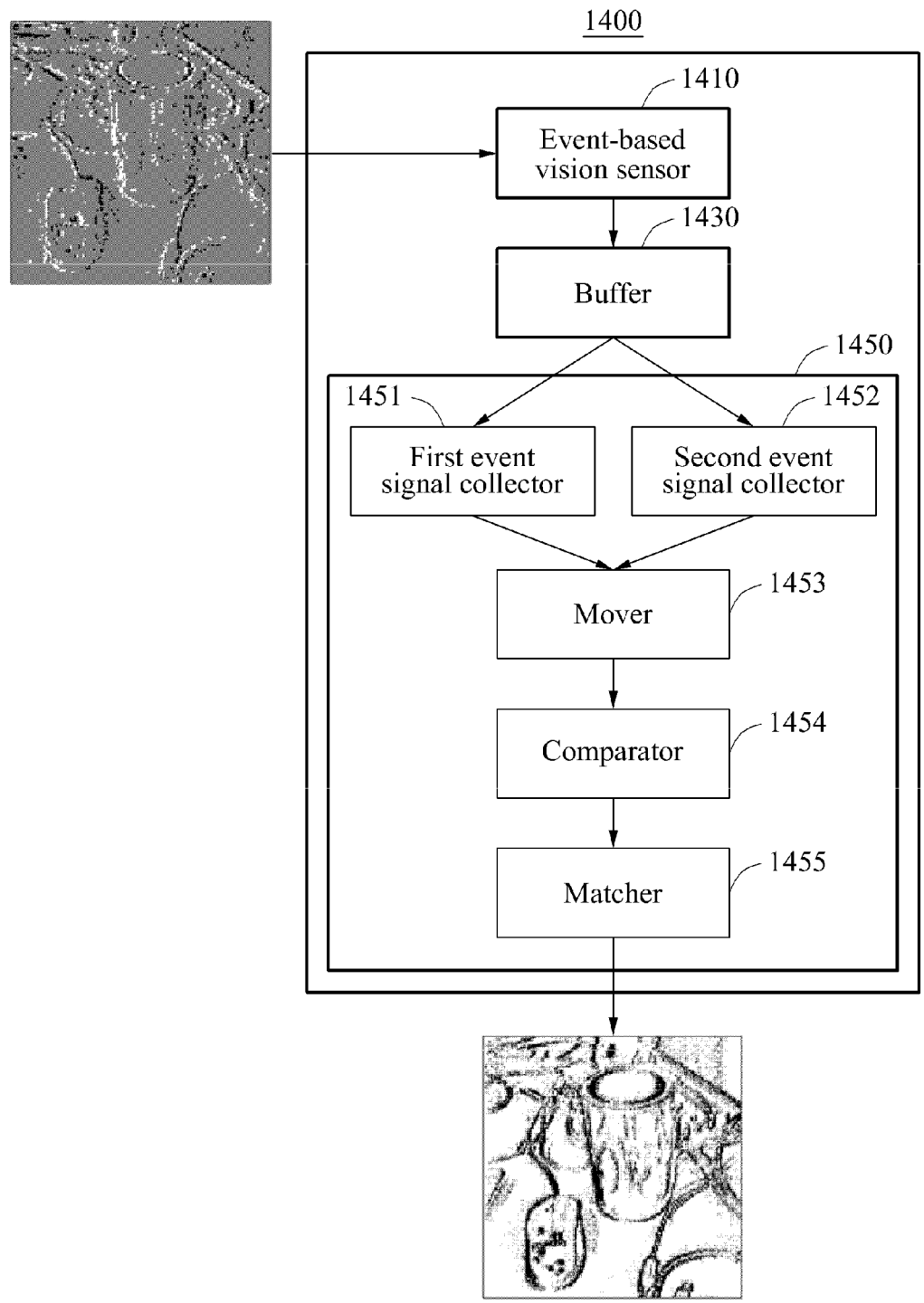

FIGS. 13 and 14 are block diagrams illustrating image generating apparatuses according to exemplary embodiments. Referring to FIG. 13, an image generating apparatus 1300 according to an exemplary embodiment includes an event-based vision sensor 1310, a buffer 1320, and a processor 1330. The event-based vision sensor 1310, the buffer 1320, and the processor 1330 are connected to each other via a bus 1340.

The event-based vision sensor 1310 may sense a change in light. The event-based vision sensor 1310 may include a pixel array. Each pixel included in the pixel array may sense a change in light incident to the corresponding pixel. The event-based vision sensor 1310 may output event signal(s) corresponding to pixel(s) sensing a change in light. The event-based vision sensor 1310 may output an event signal in response to sensing a movement of an object.

The buffer 1320 may be configured to store event signals sensed in a first time period and event signals sensed in a second time period, the event signals sensed by the event-based vision sensor 1310. Each event signal may include identification information indicating a pixel sensing an event, among the plurality of pixels included in the event-based vision sensor 1310, and time information related to a time at which an event is sensed.

The processor 1330 may be implemented as a microprocessor, a controller, a central processing unit (CPU), an arithmetic logic unit (ALU), a digital signal processor, a field programmable gate array (FPGA), a programmable logic unit (PLU), at least one general-purpose or special-purpose computer capable of responding to and executing instructions, or various combinations thereof.

Hereinafter, for ease of description, a structure and an operation of the image generating apparatus 1300 will be described. However, exemplary embodiments may be applicable to various computing devices, and mobile devices such as smart televisions, smart phones, and wearable devices, and various types of security devices.

The processor 1330 may generate a first image based on the event signals corresponding to the first time period and stored in the buffer 1320, and generate a second image based on the event signals corresponding to the second time period and stored in the buffer 1320. The processor 1330 may generate a third image of a higher quality than those of the first image and the second image by aligning the first image and the second image.

The processor 1330 may extract event signals stored in the buffer 1320 in an inverse order of time at which an event is sensed, and determine a first threshold for the first image based on dispersion of the extracted event signals. The processor 1330 may determine whether an event signal is to be additionally extracted from the buffer 1320 based on a result of comparing a number of the extracted event signals to the first threshold.

The processor 1330 may extract remaining event signals, excluding the event signals used to generate the first image from the event signals stored in the buffer 1320, in an inverse order of time at which an event is sensed. The processor 1330 may determine a second threshold for the second image based on dispersion of the extracted event signals, and determine whether an event signal is to be additionally extracted from the buffer 1320 based on a result of comparing a number of the extracted event signals to the second threshold.

The processor 1330 may extract event signals stored in the buffer 1320 in an inverse order of time at which an event is sensed, and determine a solid level associated with the extracted event signals. The processor 1330 may determine whether an event signal is to be additionally extracted from the buffer 1320 based on a result of comparing the solid level to a preset threshold.

The processor 1330 may generate aligned candidate images by aligning the second image with the first image through at least one among movement, rotation, reduction, and enlargement.

The processor 1330 may divide the first image into a plurality of areas, and generate aligned candidate images for each area by moving or rotating at least a portion of the second image such that the portion of the second image is aligned with each of the plurality of areas.

The processor 1330 may recognize a plurality of objects in the first image, and generate aligned candidate images by moving or rotating at least a portion of the second image such that the portion of the second image is aligned with each of the plurality of objects.

The processor 1330 may set a movement distance of the second image based on an enlargement ratio or a reduction ratio of the second image to the first image. The processor 1330 may generate aligned candidate images by moving the second image the set movement distance to be aligned with the first image.

The processor 1330 may calculate similarities between the first image and the aligned candidate images, and generate the third image by aligning an aligned candidate image corresponding to a maximum similarity, among the calculated similarities, with the first image.

The processor 1330 may calculate the similarities based on a sum of values of event signals corresponding to pixels at the same positions in the first image and the aligned candidate images.

Further, the processor 1330 may perform at least one among the methods described with reference to FIGS. 1 through 12. The processor 1330 may execute programs, and control the image generating apparatus 1300. A program code to be executed by the processor 1330 may be stored in a memory. The image generating apparatus 1300 may be connected to an external device, for example, a personal computer or a network, through an input/output interface and exchange data with the external device.

At least one among the methods described with reference to FIGS. 1 through 12 may be implemented in a form of an application executed by a processor in a tablet computer, a smart phone, a smart television, or a wearable device, or may be implemented in a form of a chip and embedded in a smart phone, a smart television, a wearable device, an intelligent automobile, or other various audio video (AV) devices.

Referring to FIG. 14, an image generating apparatus 1400 according to an exemplary embodiment includes an event-based vision sensor 1410, a buffer 1430, and a processor 1450.

The buffer 1430 may be configured to store event signals sensed by the event-based vision sensor 1410, and output the event signals in an inverse order starting from a recently generated event signal when the processor 1450 is to generate an image. Here, a number of the event signals stored in the buffer 1430 may correspond to a predetermined capacity of the buffer 1430. The buffer 1430 may also be configured to store a position of a pixel in which an event signal is generated, a time at which an event signal is generated, a brightness of a pixel in which an event occurs. In addition, the descriptions of the event-based vision sensor 1310 and the buffer 1320 of FIG. 13 may be applicable to the event-based vision sensor 1410 and the buffer 1420, and thus duplicated descriptions will be omitted for conciseness.

The processor 1450 includes a first event signal collector 1451, a second event signal collector 1452, a mover 1453, a comparator 1454, and a matcher 1455.

The first event signal collector 1451 may collect first event signals from the buffer 1430. The first event signal collector 1451 may generate a first image based on the collected first event signals. The first event signal collector 1451 may generate an initial aligned image that is a base of image matching.

When a number of first event signals to be used to generate the first image is insufficient, an error may increase in a future image moving and matching process, and thus an appropriate matched or aligned image may not be generated. The first event signal collector 1451 may use a greater number of event signals to generate the first image than a number of event signals to generate a second image. The number of the event signals to be used to generate the first image may vary depending on a situation. For example, the first event signal collector 1451 may obtain a value proportional to an area on an image occupied by the first event signals by multiplying horizontal dispersion and vertical dispersion of the first event signals. The first event signal collector 1451 may complete the generation of the first image when the number of the first event signals is greater than a product of the obtained value and a predefined constant.

The second event signal collector 1452 may collect second event signals from the buffer 1430. The second event signal collector 1452 may generate second image(s) based on the collected second event signals. The second event signal collector 1452 may also complete the generation of the second image using a scheme similar to that used by the first event signal collector 1451. However, the second event signal collector 1452 may generate the second image based on a fewer number of event signals than the number of the event signals used by the first event signal collector 1451. The number of the second event signals to be used to generate the second image may vary depending on a situation.

The mover 1453 may move the second image(s) to position(s) at which the second image(s) may be aligned with the first image through at least one motion of movement, rotation, reduction, and enlargement. The mover 1453 may generate an image moved from the second image. The mover 1453 may move the second image along a horizontal axis and a vertical axis. The mover 1453 may move the second image along the horizontal axis, the vertical axis, and a forward/backward axis. Further, the mover 1453 may move the second image along the horizontal axis, the vertical axis, and the forward and backward axis, and rotate the second image in three directions, for example, pitch, yaw, and roll.

The comparator 1454 may calculate similarities between the aligned image, for example, the first image, and the moved second image(s) generated by the mover 1453. The comparator 1454 may calculate a sum of products of pixel values at the same positions in two images as a similarity.

The matcher 1455 may additionally align a moved second image corresponding to a maximum similarity, among the calculated similarities, with the aligned image. The matcher 1455 may output a final image by additionally aligning a second image having the maximum similarity, among the moved second image(s), with the aligned image.

In addition, the exemplary embodiments may also be implemented through computer-readable code and/or instructions on a medium, e.g., a computer-readable medium, to control at least one processing element to implement any above-described embodiments. The medium may correspond to any medium or media that may serve as a storage and/or perform transmission of the computer-readable code.

The computer-readable code may be recorded and/or transferred on a medium in a variety of ways, and examples of the medium include recording media, such as magnetic storage media (e.g., ROM, floppy disks, hard disks, etc.) and optical recording media (e.g., compact disc read only memories (CD-ROMs) or digital versatile discs (DVDs)), and transmission media such as Internet transmission media. Thus, the medium may have a structure suitable for storing or carrying a signal or information, such as a device carrying a bitstream according to one or more exemplary embodiments. The medium may also be on a distributed network, so that the computer-readable code is stored and/or transferred on the medium and executed in a distributed fashion. Furthermore, the processing element may include a processor or a computer processor, and the processing element may be distributed and/or included in a single device.

The foregoing exemplary embodiments are examples and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. An image generating method comprising:
   generating a first image based on first event signals that are output from an event-based vision sensor during a first time period and stored in a buffer;
   generating a second image based on second event signals that are output from the event-based vision sensor during a second time period and stored in the buffer; and
   aligning the first image and the second image to generate a third image having a quality that is higher than qualities of the first image and the second image.

2. The method of claim 1, wherein each of the first event signals and the second event signals comprises identification information indicating a pixel sensing an event, among pixels included in the event-based vision sensor, and time information indicating a time at which the event is sensed.

3. The method of claim 1, wherein a number of the first event signals is greater than a number of the second event signals.

4. The method of claim 1, wherein the generating the first image comprises:
   extracting the stored first event signals from the buffer in an inverse order of time at which an event is sensed;
   determining a threshold for the first image based on dispersion of the extracted first event signals;
   determining whether a number of the extracted first event signals is greater than the threshold; and
   extracting, from the buffer, one or more additional event signals that are stored in the buffer in an inverse order of time at which an event is sensed, in response to the determining that the number of the extracted first event signals is less than or equal to the threshold.

5. The method of claim 1, wherein the generating the second image comprises:
   extracting the stored second event signals from the buffer in an inverse order of time at which an event is sensed;
   determining a threshold for the second image based on dispersion of the extracted second event signals;
   determining whether a number of the extracted second event signals is greater than the threshold; and
   extracting, from the buffer, one or more additional event signals that are stored in the buffer in an inverse order of time at which an event sensed, in response to the determining that the number of the extracted second event signals is less than or equal to the threshold.

6. The method of claim 1, wherein the generating the first image comprises:
   extracting the stored first event signals from in the buffer in an inverse order of time at which an event is sensed;
   determining a solid level of the extracted first event signals;
   determining whether the solid level is less than or equal to a threshold; and
   extracting, from the buffer, one or more additional event signals that are stored in the buffer in an inverse order of time at which an event is sensed, in response to the determining that the solid level is less than or equal to the threshold.

7. The method of claim 1, wherein the aligning comprises aligning the second image with the first image through at least one motion of movement, rotation, reduction, and enlargement to generate aligned candidate images.

8. The method of claim 7, wherein the aligning further comprises:
   determining similarities between the first image and the aligned candidate images; and
   aligning an aligned candidate image having a maximum similarity, among the similarities, with the first image to generate the third image.

9. The method of claim 8, wherein the determining comprises determining the similarities based on a sum of values of event signals corresponding to pixels at positions in the first image and positions in the aligned candidate images, among the first event signals and the second event signals, the positions in the first image being same as the positions in the aligned candidate images.

10. The method of claim 1, wherein the aligning comprises:
    dividing the first image into areas; and
    moving and/or rotating a portion of the second image such that the portion of the second image is aligned with each of the areas to generate aligned candidate images for each of the areas.

11. The method of claim 1, wherein the aligning comprises:
    recognizing objects in the first image; and
    moving and/or rotating a portion of the second image such that the portion of the second image is aligned with each of the objects to generate aligned candidate images for each of the objects.

12. The method of claim 1, wherein the aligning comprises:
    determining a distance of movement of the second image based on an enlargement ratio or a reduction ratio of the second image to the first image; and
    moving the second image the distance of the movement to be aligned with the first image.

13. The method of claim 1, wherein the aligning comprises rotating and moving the second image in three directions of six degrees of freedom based on distance information and an ON event signal or an OFF event signal among the first event signals and the second event signals.

14. The method of claim 1, further comprising removing, from the first event signals and the second event signals, a noise signal that is an event signal farther than a distance from the first event signals and the second event signals.

15. The method of claim 1, further comprising correcting lens distortion of the first event signals and the second event signals by camera calibration.

16. A non-transitory computer-readable storage medium storing a program comprising instructions to cause a computer to perform the method of claim 1.

17. An image generating apparatus comprising:
an event-based vision sensor configured to output first event signals during a first time period and second event signals during a second time period;
a buffer configured to store the first event signals and the second event signals; and
a processor configured to:
generate a first image based on the first event signals;
generate a second image based on the second event signals; and
align the first image and the second image to generate a third image having a quality that is higher than qualities of the first image and the second image.

18. The apparatus of claim 17, wherein each of the first event signals and the second event signals comprises identification information indicating a pixel sensing an event, among pixels included in the event-based vision sensor, and time information indicating a time at which the event is sensed.

19. The apparatus of claim 17, wherein the processor is further configured to:
extract the stored first event signals from the buffer in an inverse order of time at which an event is sensed;
determine a threshold for the first image based on dispersion of the extracted first event signals;
determine whether a number of the extracted first event signals is greater than the threshold; and
extract, from the buffer, one or more additional event signals that are stored in the buffer in an inverse order of time at which an event is sensed, in response to the determination that the number of the extracted first event signals is less than or equal to the threshold.

20. The apparatus of claim 17, wherein the processor is further configured to:
extract the stored second event signals from the buffer in an inverse order of time at which an event is sensed;
determine a threshold for the second image based on dispersion of the extracted second event signals;
determine whether a number of the extracted second event signals is greater than the threshold; and
extract, from the buffer, one or more additional event signals that are stored in the buffer in an inverse order of time at which an event is sensed, in response to the determination that the number of the extracted second event signals is less than or equal to the threshold.

21. The apparatus of claim 17, wherein the processor is further configured to:
extract the stored first event signals from in the buffer in an inverse order of time at which an event is sensed;
determine a solid level of the extracted first event signals;
determine whether the solid level is less than or equal to a threshold; and
extract, from the buffer, one or more additional event signals that are stored in the buffer in an inverse order of time at which an event is sensed, in response to the determination that the solid level is less than or equal to the threshold.

22. The apparatus of claim 17, wherein the processor is further configured to align the second image with the first image through at least one motion of movement, rotation, reduction, and enlargement to generate aligned candidate images.

23. The apparatus of claim 22, wherein the processor is further configured to:
determine similarities between the first image and the aligned candidate images; and
aligning an aligned candidate image having a maximum similarity, among the similarities, with the first image to generate the third image.

24. The apparatus of claim 23, wherein the processor is further configured to determine the similarities based on a sum of values of event signals corresponding to pixels at positions in the first image and positions in the aligned candidate images, among the first event signals and the second event signals, the positions in the first image being same as the positions in the aligned candidate images.

25. The apparatus of claim 17, wherein the processor is further configured to:
divide the first image into areas; and
move and/or rotate a portion of the second image such that the portion of the second image is aligned with each of the areas to generate aligned candidate images for each of the areas.

26. The apparatus of claim 17, wherein the processor is further configured to:
recognize objects in the first image; and
move and/or rotate a portion of the second image such that the portion of the second image is aligned with each of the objects to generate aligned candidate images for each of the objects.

27. The apparatus of claim 17, wherein the processor is further configured to:
determine a distance of movement of the second image based on an enlargement ratio or a reduction ratio of the second image to the first image; and
move the second image the distance of movement to be aligned with the first image.

28. An image generating method comprising:
retrieving, from a buffer, first event signals that are output from an event-based vision sensor during a first time period, in an inverse order of time at which respective first events are sensed;
generating a first image based on the retrieved first event signals;
retrieving, from the buffer, second event signals that are output from the event-based vision sensor during a second time period, in an inverse order of time at which respective second events are sensed;
generating a second image based on the retrieved second event signals;
aligning the second image with the first image to generate aligned candidate images;
determining similarities between the first image and the aligned candidate images; and
aligning an aligned candidate image having a maximum similarity, among the similarities, with the first image to generate the third image.

29. The method of claim 28, further comprising determining a distance of movement of the aligned candidate image having the maximum similarity, based on an enlargement ratio or a reduction ratio of the aligned candidate image to the first image,
wherein the aligning the aligned candidate image comprises moving the aligned candidate image the distance of the movement to be aligned with the first image.

* * * * *